United States Patent [19]

Power et al.

[11] 4,381,795
[45] May 3, 1983

[54] DIVERTER VALVE CONSTRUCTION AND METHOD OF MAKING SAME

[75] Inventors: John B. Power; Thomas M. Casale, both of Arlington Heights; Victor Pauperas, Oak Lawn, all of Ill.

[73] Assignee: Dayco Corporation, Dayton, Ohio

[21] Appl. No.: 239,234

[22] Filed: Mar. 2, 1981

[51] Int. Cl.³ .......................................... F16K 49/00
[52] U.S. Cl. .................................. 137/240; 137/340; 137/375; 137/883; 137/885
[58] Field of Search ............... 137/375, 340, 240, 883, 137/885; 251/368

[56] References Cited

U.S. PATENT DOCUMENTS

| 856,252 | 6/1907 | Hammarberg | 137/340 |
|---|---|---|---|
| 1,323,328 | 12/1919 | Slick et al. | 137/340 |
| 2,575,875 | 11/1951 | Johnson | 137/340 |
| 2,994,338 | 8/1961 | Wilson | 137/340 |
| 4,079,747 | 3/1978 | Roberts | 251/368 |
| 4,292,993 | 10/1981 | Felthuis et al. | 137/375 |

Primary Examiner—A. Michael Chambers
Attorney, Agent, or Firm—Fitch, Even, Tabin, Flannery & Welsh

[57] ABSTRACT

A diverter valve construction for controlling flow therethrough of a high temperature fluid and method of making same are provided wherein the valve construction comprises a metal housing, a refractory lining for substantially the entire inside surface of the housing, passage means in the valve construction including an inlet passage and a pair of outlet passages, and flow control means for controlling fluid flow between the inlet and outlet passages and wherein the flow control means comprises a pair of poppet valves with each of the poppet valves being supported within the housing and being adapted to be operated independently of the other poppet valve, and a pair of ceramic tubular valve seat members fixed against the refractory lining with each seat member being adapted to receive a portion of an associated poppet valve thereagainst to control flow therethrough to an associated outlet passage.

3 Claims, 6 Drawing Figures

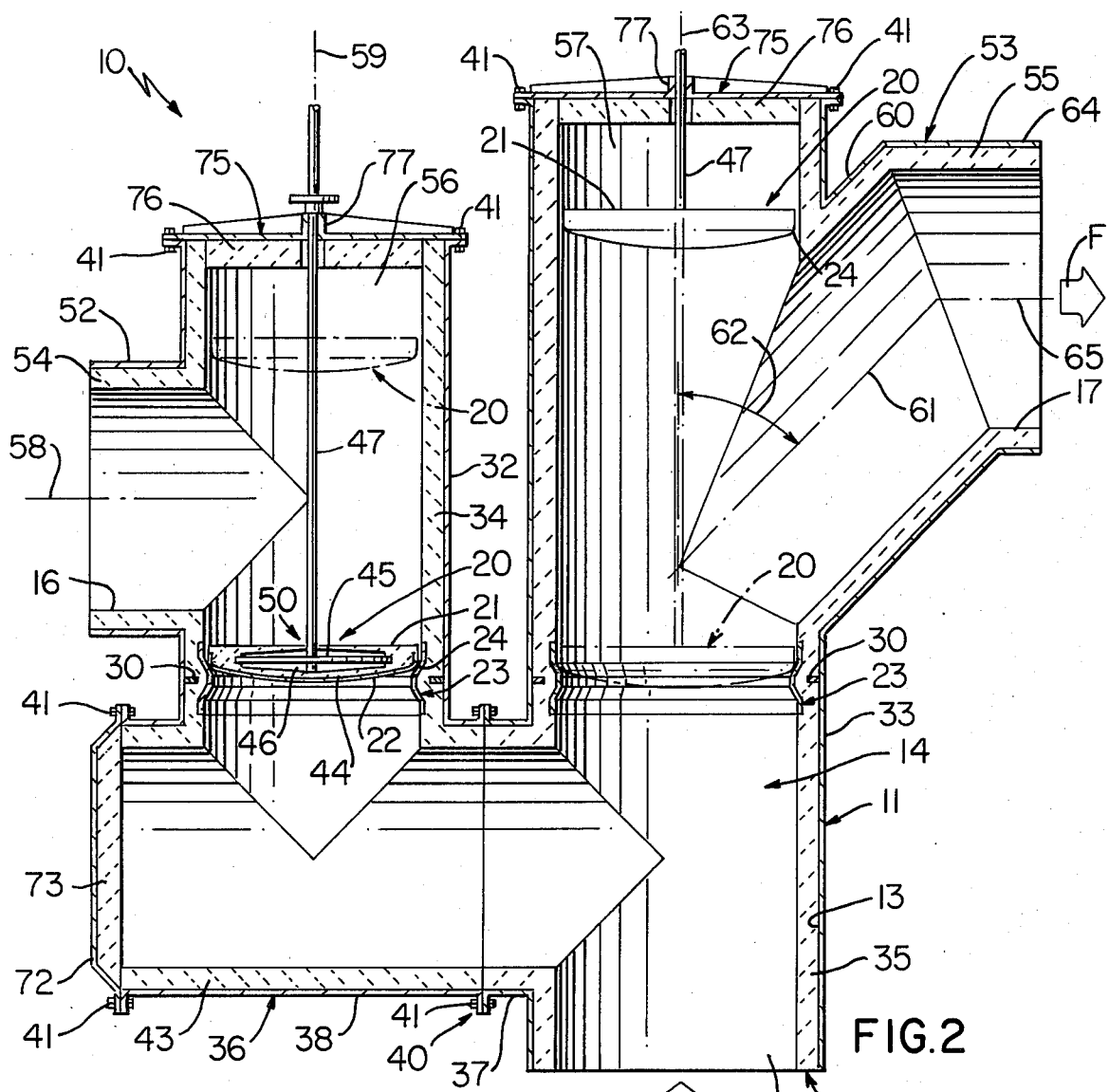
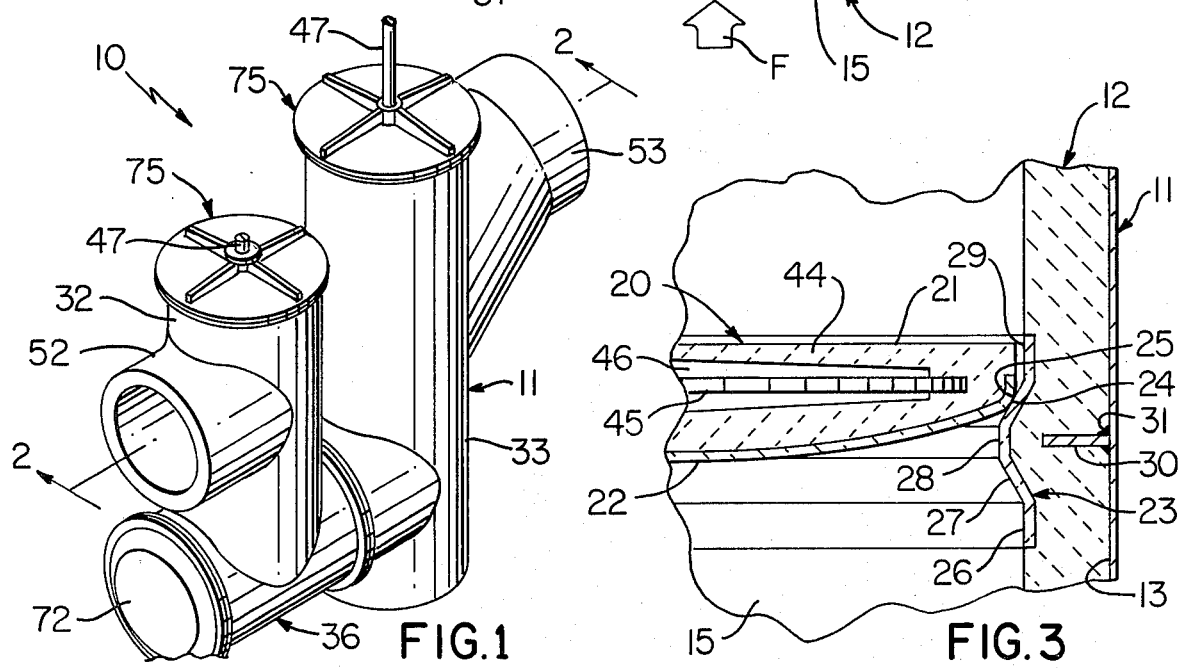

DIVERTER VALVE CONSTRUCTION AND METHOD OF MAKING SAME

BACKGROUND OF THE INVENTION

1. Field of the Invention

This invention relates to a diverter valve construction for controlling flow therethrough of a high temperature fluid and to a method of making such a valve.

2. Prior Art Statement

Diverter valve constructions capable of operating for long periods of time while controlling high temperature fluids flowing therethrough are known in the art and used in numerous applications, such as, electrical power generating stations, refineries, and the like. In such applications it is common practice to employ valve constructions having effective flow diameters ranging from roughly one foot to as much as ten feet in diameter, and even larger.

It is known in the art to provide a diverter valve construction for controlling flow therethrough of a high temperature fluid wherein the valve comprises a metal housing, a refractory lining carried by the housing and lining substantially the entire inside surface of the housing, passage means in the valve construction including an inlet passage and a pair of outlet passages, and flow control means for controlling flow of the fluid between the inlet and outlet passages.

However, diverter valve constructions which have been proposed previously to control the flow of fluid therethrough wherein such fluid may be at temperatures generally of the order of 2,000° F. have various deficiencies. One deficiency with certain ones of such valve constructions is that the internal parts thereof and particularly its valve closure members and associated components tend to be rapidly eroded and/or corroded by the high temperature fluid flowing therethrough, especially in applications where such fluid has abrasive particles, and the like, entrained therein. Another deficiency is that others of such valve constructions employ comparatively slow acting valve closure members which are interdependent during operation and thus are comparatively slow acting. Another deficiency is that others of such valve constructions are often provided in comparatively expensive metal housings reducing the cost competitiveness thereof. Another deficiency is that others of such valve constructions often require complex and expensive cooling systems in order to assure satisfactory operation.

It is an object of this invention to provide an improved diverter valve construction which is capable of satisfactory operation for a comparatively long service life while flowing fluids therethrough at temperatures of the magnitude mentioned.

Another object of this invention is to provide an improved method of making such a valve construction.

Other aspects, embodiments, objects, and advantages of this invention will become apparent from the following specification, claims, and drawings.

SUMMARY

In accordance with the present invention there is provided an improved diverter valve construction which overcomes the above-mentioned deficiencies. The improved diverter valve construction is particularly adapted for controlling flow therethrough of high temperature fluid and the valve construction comprises a metal housing, a refractory lining carried by the housing, and lining substantially the entire inside surface of the housing passage means in the valve construction including an inlet passage and a pair of outlet passages, and a flow control means for controlling flow of the fluid between the inlet and outlet passages.

In accordance with one embodiment of this invention the flow control means comprises a pair of poppet valves and each of the poppet valves is supported within the housing and is adapted to be operated independently of the other poppet valve and each of the poppet valves has a closure assembly with a ceramic protective member fixed thereto; and, a pair of ceramic tubular valve seat members is provided and fixed against the refractory lining with each seat member being adapted to receive a protective member of an associated closure assembly thereagainst. Each of the closure assemblies cooperates with an associated seat member to control flow therethrough to an associated outlet passage and each of the seat members enables repeated cycling of an associated protective member thereagainst with minimum wear.

Also provided in accordance with this invention is an improved method of making a diverter valve construction of the character mentioned.

BRIEF DESCRIPTION OF THE DRAWINGS

The accompanying drawings show present preferred embodiments of this invention, in which FIG. 1 is an isometric view with parts broken away illustrating one exemplary embodiment of the valve construction of this invention;

FIG. 2 is an enlarged primarily cross-sectional view taken essentially on the line 2—2 of FIG. 1 and showing a pair of substantially identical poppet valves comprising the valve construction;

FIG. 3 is a greatly enlarged fragmentary cross-sectional view particularly illustrating a typical closure assembly of one of the poppet valves of FIG. 1 with such assembly disposed against an associated ceramic tubular valve seat member;

DETAILED DESCRIPTION

Figure 4:
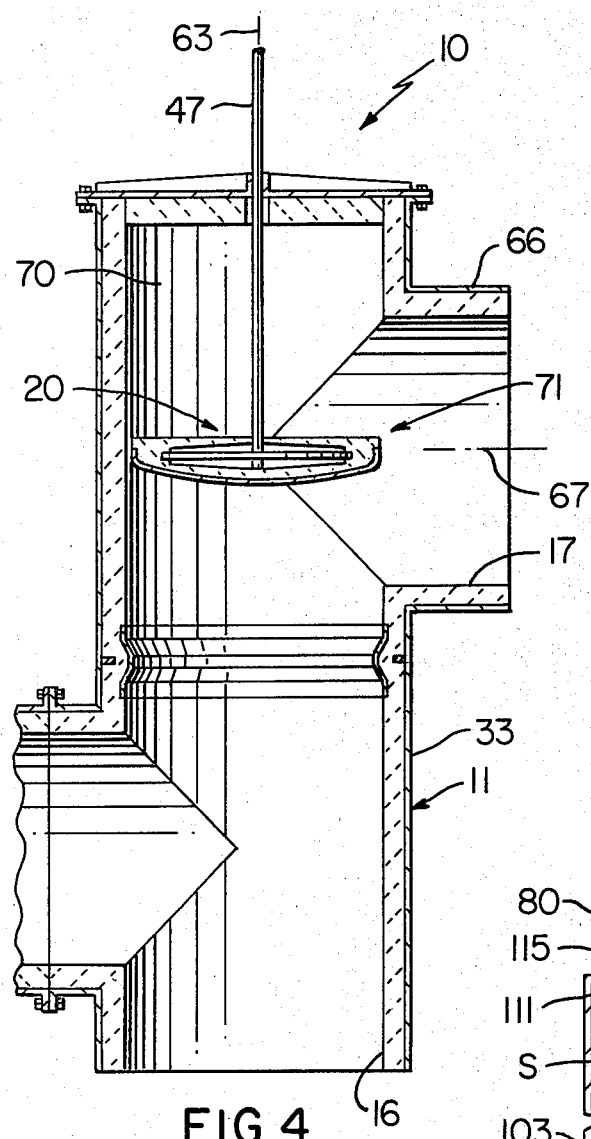
FIG. 4 is a view similar to the right-hand portion of FIG. 2 illustrating a modification of the valve construction of this invention.

Reference is now made to FIG. 1 of the drawings which illustrates one exemplary embodiment of a diverter valve construction of this invention which is designated generally by the reference numeral 10; and, such valve construction is particularly adapted for controlling flow therethrough of high temperature fluid F (FIG. 2) including liquids, gases, and mixtures thereof, and wherein such fluid may be at temperatures generally of the order of 2,000° F. The valve construction or valve 10 is particularly adapted to be used in energy recovery systems and subsystems associated with electric power generating stations, refineries, and the like.

The valve construction 10 comprises a metal housing which is designated generally by the reference numeral 11 and a refractory lining, which is designated generally by the reference numeral 12, carried by the housing 11 and lining substantially the entire inside surface 13 of the housing 11. The valve construction 10 has passage means designated generally by the reference numeral 14 therein including an inlet passage 15 and a pair of outlet passages 16 and 17.

The valve construction 10 also has flow control means for controlling flow of the fluid F between the inlet passage 15 and the outlet passages 16 and 17 and such flow control means comprises a pair of substantially identical poppet valves each designated by the same reference numeral 20; and, each of the poppet valves 20 is suitably supported within housing 11 for operating movements in a manner which will be described in more detail subsequently. Each poppet valve 20 is adapted to be operated independently of the other poppet valve 20; and, each poppet valve 20 has a closure assembly 21 which has a ceramic protective member 22 (FIG. 3) fixed thereto. The valve construction 10 also has a pair of ceramic substantially tubular valve seat members each designated by the same reference numeral 23 suitably fixed against the refractory lining 12.

During operation of the valve construction 10, each of the closure assemblies 21 cooperates with an associated seat member 23 to control flow therethrough of the high temperature fluid F to an associated outlet passage. For example, in the illustration of FIG. 2 the poppet valve 20 shown at the left of the valve construction 10 is in its fully closed position while the poppet valve 20 shown at the right of such construction is in its fully open position whereby the flow of fluid F enters inlet passage 15 and flows through the valve construction 10 exiting the outlet passage 17.

As previously indicated each of the protective members 22 is a ceramic member and each of the seat members 23 is a ceramic member; and, preferably such members 22–23 are made of silicon carbide. Further, the construction and arrangement of each seat member 23 is such that it may receive repeated cycling of an associated protective member 22 thereagainst with minimum wear. Likewise, each protective member 22 is constructed and arranged to minimize wear caused by the abovementioned cycling while still providing a fluid-tight seal; and, each member protects its assembly against direct impingement of hot fluid and any abrasive particles which may be contained therein.

Accordingly, it is seen that each of the protective members 22 has an annular edge portion 24, which extends in an arc of roughly 90° when viewed in cross section; and, such edge portion is particularly adapted to engage a frustoconical surface portion 25 of the seat member 23 to provide the above-mentioned fluid-tight seal. Each seat member 23 is made as a high-strength tubular structure and when viewed along its axial length, as shown in FIG. 3, has a cylindrical portion 26 at one end which is adjoined by a frustoconical portion 27, which is in turn adjoined by a cylindrical tubular portion 28 of limited axial height. The cylindrical portion 28 is adjoined by the frustoconical portion 25 and the frustoconical portion 25 is adjoined by a cylindrical portion 29.

To strengthen the refractory lining 12 between each seat member 23 and housing 12 a reinforcing structure 30 is suitably fixed to the housing as by welds 31. It will also be appreciated that reinforcing members (now shown) may be provided at desired locations throughout the lining by welding same to the inside surface 13 of the housing 11.

As will be readily apparent from FIG. 2 of the drawing the valve housing 11 comprises a pair of parallel tubular portions 32 and 33 each having a corresponding tubular portion 34 and 35 of the refractory lining 12 respectively bonded thereagainst. The valve housing also comprises a transverse portion 36 which is defined by a pair of tubular parts 37 and 38 which are fixed together by fixing associated flanges thereof together as illustrated at 40 employing a plurality of nut and bolt assemblies 41 with each nut and bolt assembly 41 extending through associated aligned openings in the associated flanges. The transverse tubular portion 36 interconnects the parallel portions 32 and 33 adjacent one end portion thereof and places such tubular portions 32 and 33 in flow communication. The transverse tubular portion 36 also has a corresponding portion of the refractory lining comprising same and although such corresponding portion is comprised basically of two parts it will be designated generally by the single reference numeral 43.

The inlet passage 15 of the valve construction 10 is provided in the parallel portion 33; and, it will also be seen that the outlet passage 16 is associated with the parallel portion 32 while the other outlet passage 17 is associated with the other parallel portion 33. The valve construction 10 is of optimum simplicity whereby each of the poppet valves 20 is adapted to be operated in an associated one of the parallel portions, either 32 or 33, to control flow therethrough to an associated outlet passage. Accordingly, each of the ceramic tubular valve seat members 23 is fixed against an associated tubular portion of the refractory lining with one valve seat member 23 being in the tubular portion 34 of the refractory lining 12 and the other seat member 23 being in the other tubular portion 35 of the refractory lining 12.

The valve construction 10 preferably has each of its ceramic tubular seat members 23 disposed adjacent the inlet passage 15. The transverse tubular portion 36 of the valve construction 10, in essence, serves as a by-pass valve construction and is disposed upstream of the tubular seat members 23 and hence upstream of the poppet valves 20 when such poppet valves are in their closed positions.

Each of the closure assemblies 21 comprising each poppet valve 20 has a refractory material 44 defining the main body thereof. Further, each main body has an associated ceramic protective member 22 comprising same and in this example of the invention each protective member 22 defines the lower surface of the closure assembly 21 as viewed in the drawings. Each closure assembly 21 also has a structural disc 45 embedded substantially centrally within the main body and the embedment is such that a void space 46 (for minimum weight considerations) is provided on each side of the disc with the disc being firmly held by the refractory material at its peripheral edge portion.

Each poppet valve 20 has an actuating stem 47 (FIG. 2) which is operatively associated with its disc 45. Each stem 47 extends through a portion of the refractory material 44, as shown at 50 in FIG. 2, which defines the main body of the assembly 21. Each poppet valve 20 has actuating means which is designated generally by the reference numeral 51 in FIG. 6. The actuating means 51 has means operatively connected to each stem 47; and, the actuating means serves to actuate each stem 47 and its assembly 21 (and thus serves to actuate each poppet valve 20) in an independent manner. The operation of the actuating means 51 will be described in more detail subsequently.

The valve housing 11 of the valve construction 10 also comprises a pair of transverse tubular flanges each communicating with an associated one of the parallel tubular portions 32 and 33. In this example of the invention a transverse tubular flange 52 is provided and communicates with tubular portion 32 while a transverse tubular flange 53 is provided and communicates with the tubular portion 33. The tubular flange 52 has a corresponding portion 54 of the refractory lining 12 provided therein while the tubular flange 53 has a corresponding portion 55 of the refractory lining 12 provided therein. Each tubular flange 52 and 53 is disposed along its parallel tubular portion so as to define a space in a downstream part of its parallel tubular portion, whereby flange 52 defines a space 56 while flange 53 defines a space 57.

Each of the spaces 56 and 57 is adapted to receive an associated closure assembly 21 therewithin with the associated closure assembly in its full open position to thereby effectively remove the associated closure assembly 21 from within the stream of the fluid flowing from the inlet passage 15 to an associated outlet passage and thus minimize wear of the associated closure assembly. For example, the tubular flange 52 has outlet passage 16 extending therethrough while the tubular flange 53 has outlet passage 17 extending therethrough; and, with the closure assembly 21 associated with the transverse tubular flange 53 in its fully open position the closure assembly is within space 57 whereby fluid F flows in an unobstructed manner from inlet passage 15, through parallel tubular portion 33 and exits the outlet passage 17. Once the closure assembly 21 is in the space 57 it is, in essence, in a protected position and isolated so that it receives minimum impingement of fluid F and any abrasive particles entrained in such fluid F whereby the operating life of the assembly is increased. Once the associated assembly 21 is in the space 56 (with the outlet passage 17 closed and the outlet passage 16 open) a similar protective action takes place.

In the usual application in which the valve construction 10 is employed, it is generally necessary to instantaneously close flow from the inlet passage 15 through one outlet passage (17 in this example) after substantially instantaneously opening the poppet valve 20 associated with the outlet passage 16. The time increment involved between the opening of passage 16 and the closing of passage 17 is of the order of a fractional part of a second.

The valve construction 10 has its tubular outlet flange 52 disposed with its central longitudinal axis 58 perpendicular to the longitudinal axis 59 of its parallel tubular portion 32. The tubular flange 53 has an inner part 60 disposed with its central axis 61 at an acute angle 62 with the longitudinal axis 63 of its parallel tubular portion 33; and, the tubular flange 53 also has an outer part 64 disposed with its central axis 65 perpendicular to the longitudinal axis 63 of its parallel tubular portion 33. This construction provides for minimum resistance to the flow of fluid F through the valve in the position thereof illustrated in FIG. 2 which is the usual valve operating position.

However, it will be appreciated that in some applications of this invention it may be desirable and indeed preferred to dispose both tubular outlet flanges so that their axes are in substantially parallel relation with the passages 16 and 17 providing fluid flow in opposite directions from the valve housing 11. Accordingly, FIG. 4 illustrates such a modification of the valve of FIG. 1 wherein a tubular outlet flange 66, which has the outlet passage 17 therein, is disposed with its central axis 67 perpendicular to the longitudinal axis 63 of its parallel tubular portion 33. In all other respects the valve construction 10 of FIG. 4 is substantially identical to the previously described valve construction 10 and thus will not be described further. It will also be seen that the valve construction 10 of FIG. 4 has a space 70 similar to the space 57; and, the space 70 is provided for the same reasons as the space 57 and such reasons will not be repeated.

The valve construction 10 of FIG. 4 is shown with the poppet valve 20 thereof associated with outlet passage 17 in a position intermediate its fully closed and fully open positions and as shown at 71. In situations where the valve 20 comprising the left portion of the valve construction of FIG. 4 is in its closed position, the poppet valve 20 may be disposed in the intermediate position 71 for the purpose of controlling the amount of flow of fluid through the outlet passage 17 and thus provide a controlling function. It will be appreciated that, if desired, the poppet valve 20 provided in the parallel tubular portion 33 of the valve construction 10 of FIG. 2 may be operated in a similar manner to control the amount of high temperature fluid F flowing out of its outlet passage 17.

As seen in FIG. 2, the valve construction 10 has an access door 72 comprising same and the access door is also lined with a refractory material 73 which is identical to the refractory lining 12. The access door has an integral peripheral flange which is suitably detachably fixed to a corresponding flange provided at the terminal outer end of the transverse tubular portion 36 by suitable fastening means extending through such flanges; and, such fastening means comprise a plurality of nut and bolt assemblies 41.

The valve construction 10 also has a head structure 75 for each of its tubular portions 32 and 33; and, each head structure 75 is lined with a refractory material 76 which is also identical to the refractory lining 12. Each head structure 75 has a peripheral flange which is detachably fixed to a corresponding flange provided at the upper end of its tubular portion 32–33 by a plurality of nut and bolt assemblies 41.

Each head structure 75 also has dual-purpose guide and seal means 77 defined as an integral part thereof. Each dual-purpose means 77 is particularly adapted to support an associated poppet valve stem 47 for sliding movement therethrough in an antifriction manner while preventing leakage of fluid F from within the valve construction 10.

Figure 6:
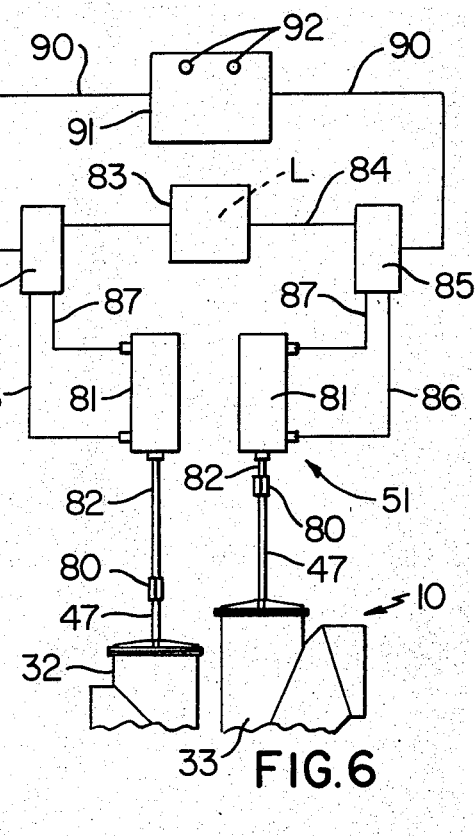
FIG. 6 is a schematic view illustrating means which may be employed to independently operate the poppet valves of the diverter valve construction of this invention.

Each poppet valve 20 is adapted to be operated in an independent manner by the previously mentioned actuating means 51 as shown in FIG. 6. Each actuating means 51 has means in the form of an internally threaded sleeve 80 connected to its poppet valve stem 47 whereby the sleeve 80 is threaded around a threaded upper end portion of stem 47. The actuating means 51 also comprises a hydraulic cylinder 81 which has a telescoping rod 82 provided with a threaded end which is threaded within the sleeve 80. Each hydraulic cylinder 81 is suitably supported at a fixed position above the valve construction 10 with its rod end attached to an associated valve stem by a threaded sleeve 80; and upon actuation of each cylinder 81 its poppet valve 20 is moved in an instantaneous manner to any desired position in the valve construction 10.

Each hydraulic cylinder 81 is actuated using a suitable hydraulic liquid L which is provided under a predetermined controlled pressure from a reservoir 83. The hydraulic liquid L is provided through a conduit 84 to a cylinder controller 85. The controller 85 may comprise an electro-hydraulic device which operates to supply liquid L through a conduit 86 to open its associated poppet valve 20 and operates to supply liquid L through a conduit 87 to close such poppet valve.

The controllers 85 are electrically connected by electrical cable assemblies 90 to an electrical control system 91. The control system 91 may have suitable manual selectors or knobs 92 which may have manual poppet valve control selectors thereon, or the like, and each knob 92 may be used to control the position of a poppet valve 20 associated therewith manually from a fully open to a fully closed position or vise versa as well as control the poppet valve to any desired position between fully open and fully closed depending on the setting of the knob 92, and as is known in the art. The control system may also be provided with automatic feedback signals as a function of conditions in conduits which have the passages 15, 16, and 17 operatively connected thereto. The feedback signals enable the control system 91 to operate in an automatic manner to control the poppet valve positions and also as is known in the art.

Figure 5:
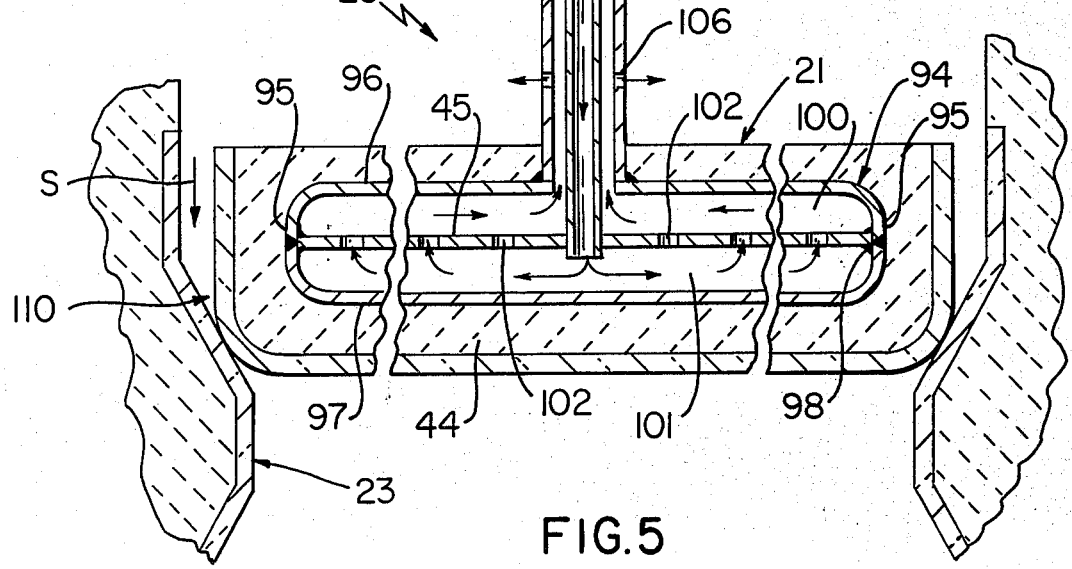
FIG. 5 is a greatly enlarged fragmentary cross-sectional view illustrating a modified poppet valve which may be utilized in the diverter valve construction of this invention.

The valve construction 10 described above employs poppet valves 20 which are not cooled by external means. However, such valve construction 10 may employ modified poppet valves provided with external cooling means and such a poppet valve is shown in FIG. 5 of the drawings and also designated generally by the reference numeral 20.

The modified poppet valve 20 has a closure assembly 21 which has a disc-enclosing wall 94 embedded in its refractory material 44. The enclosing wall 94 has a side wall portion 95 adjoined at its opposite ends by a top wall 96 and a bottom wall 97. The structural disc 45 of the modified poppet valve is disposed within the side wall 95 and has its peripheral edge fixed by welds 98 to the side wall 95 so that such disc is disposed roughly centrally within the enclosing wall 94 and defines an upper chamber 100 and a lower chamber 101 in the assembly 21 on opposite sides of the disc 45. A plurality of openings 102 are provided in the disc 45 which interconnect the chambers 100 and 101.

The modified poppet valve also has a main structural tube 103 defining its valve actuating stem 47. A flow tube 104 is also provided and disposed concentrically within the structural tube 103 and defines a cylindrical volume 105 between the flow tube and the structural tube. The modified poppet valve 20 also has a plurality of orifices 106 in its structural tube 103 adjacent a top surface portion of its assembly 21 which provide flow passages out of the cylindrical volume 105. The flow tube 104 extends through the upper chamber 100, through the disc 45 in sealed relation, and protrudes into the lower chamber 101.

The modified poppet valve also has means 108 for flowing a cooling fluid, such as steam S, through the flow tube 104 causing the cooling fluid S to flow into said bottom chamber 101, upwardly through the openings 102 into the top chamber 100, into the cylindrical volume 105, and exit the orifices 106 to cool its stem and assembly. The cooling fluid S upon exiting the orifices 106 is within the body of the valve construction 10 and with the associated poppet valve 20 closed against its valve seat member 23 the fluid S also serves to bathe the area of contact between its closure assembly 21 and seat member, as shown typically at 110, to provide a cleaning action of any particles which may have tended to accumulate on the seat member.

The means 108 for flowing the cooling steam S comprises conduit means 109 for flowing such steam into an upper end portion of the structural tube and into a compartment 111 which communicates with the upper end of the flow tube 104. The means 108 for flowing a cooling fluid also comprises a steam reservoir 112 and the conduit means 109 is in flow communication with the tubular compartment 111. The conduit means 109 comprises a rigid conduit 113 connected to the reservoir 111 and a flexible polymeric conduit 114 connected between the conduit 113 and compartment 111. The conduit 114 allows opening and closing movements of its poppet valve 20 substantially in an unobstructed manner while still providing flow of cooling steam S therethrough.

To facilitate connection of the structural conduit 103 to the actuating means 51 it will be seen that an externally threaded member 115 is fixed, as by welding, to a top closing wall 116 of the tube 103. The threaded sleeve member 80 is threaded around the member 115 as described earlier. In this manner the modified cooled poppet valves 20 of FIG. 5 may be actuated by actuating means 51 in a similar manner as described earlier for the uncooled valves 20.

The housing 11 of the valve construction 10 may be made of any suitable metal capable of withstanding elevated temperatures of the magnitude mentioned. In this example of the invention the housing 11 is preferably made of stainless steel and the structural components of the head structures 75 and access door are also made of stainless steel. The discs 45, stems 47, tubes 103–104, and enclosing walls 94 are also preferably made of stainless steel.

The protective members 22 and seat members 23 are both preferably made of silicon carbide; similar components have been made successfully by the Carborundum Company, of Keasbey, New Jersey. Each of these components is made preferably as an independent component by disposing flowable silicon carbide in a suitable mold device and allowing same to set to define a so-called green or uncured component. The uncured component is then placed in a high temperature curing furnace to complete same. After cooling the completed component is used in the build up of the valve construction 10.

As described earlier a refractory lining 12, refractory material 44, and other refractory materials identical to lining 12 are used in the valve construction. The preferred refractory material is comprised primarily of $Al_2O_3$, $SiO_2$ and $CaO$ and is referred to as a Class Q insulating castable refractory which has exceptionally high strength at elevated operating temperatures, of the order of 2500° F. One example of such a material is sold by the Plibrico Company, 1800 Kingsbury Street, Chicago, Illinois, 60614 under the Registered Trademark of PLICAST LWI 26. Typical analysis of such a material is as follows:

| Substance | % By Weight |
|---|---|
| $Al_2O_3$ | 51.34 |
| $SiO_2$ | 36.85 |
| $Fe_2O_3$ | 00.95 |
| $TiO_2$ | 1.32 |
| CaO | 7.13 |
| MgO | 0.33 |
| Alkalies | 1.32 |

While present exemplary embodiments of this invention, and methods of practicing the same, have been illustrated and described, it will be recognized that this invention may be otherwise variously embodied and practiced within the scope of the following claims.

What is claimed is:

1. In a diverter valve construction for controlling flow therethrough of a high temperature fluid, said valve construction comprising a metal housing, a refractory lining carried by said housing and lining substantially the entire inside surface of said housing, passage means in said valve construction including an inlet passage and a pair of outlet passages, and flow control means for controlling flow of said fluid between said inlet and outlet passages, said flow control means comprising a pair of poppet valves, each of said poppet valves being supported within said housing and being adapted to be operated independently of the other poppet valve, each of said poppet valves having a closure assembly with a silicon carbide ceramic protective member fixed thereto, and a pair of silicon carbide ceramic tubular valve seat members fixed against said refractory lining with each seat member being adapted to receive a protective member of an associated closure assembly thereagainst, each of said closure assemblies cooperating with an associated seat member to control flow therethrough to an associated outlet passage, each of said seat members enabling repeated cycling of an associated protective member thereagainst with minimum wear, said valve housing comprising a pair of parallel tubular portions each having a corresponding tubular portion of said refractory lining and a transverse tubular portion interconnecting said parallel portions adjacent one end portion thereof and placing same in flow communication and also having a corresponding portion of said refractory lining comprising same, said inlet passage being provided in one of said parallel portions, one of said outlet passages being associated with said one parallel portion and the other of said outlet passages being associated with the other of said parallel portions, each of said poppet valves being adapted to be operated in an associated one of said parallel portions to control flow therethrough to an associated outlet passage, each of said ceramic tubular valve seat members being fixed against an associated tubular portion of refractory lining, said ceramic tubular seat members being disposed adjacent said inlet passage and said transverse tubular portion being disposed upstream of said tubular seat members, each of said closure assemblies having a refractory material defining the main body thereof, each main body having an associated protective member comprising same, a structural disc embedded substantially centrally within said body, a poppet valve actuating stem operatively associated with said disc and extending through a portion of the refractory material defining said main body of an associated assembly, and actuating means operatively connected to said stem for actuating the associated stem and assembly, and each of said closure assemblies having a disc-enclosing wall embedded in its refractory material; said enclosing wall having a side wall portion adjoined at its opposite ends by a top wall and a bottom wall; said disc being disposed within said side wall and having its peripheral edge fixed to said side wall so that said disc is disposed roughly centrally within said enclosing wall and defines an upper chamber and a lower chamber in the assembly on opposite sides of said disc; a plurality of openings in said disc interconnecting said chambers; a main structural tube defining said valve actuating stem; a flow tube disposed concentrically within said structural tube and defining a cylindrical volume between said flow tube and said structural tube; a plurality of orifices in said structural tube adjacent a top surface portion of its structural assembly providing flow passages out of said cylindrical volume; said flow tube extending through said upper chamber, through said disc in sealed relation, and exiting into said lower chamber; and means for flowing a cooling fluid through said flow tube causing said cooling fluid to flow into said bottom chamber, upwardly through said openings into said top chamber, into said cylindrical volume, and exit said orifices to cool its stem and assembly; said cooling fluid upon exiting said orifices also serving to bathe the area of contact between its closure assembly and seat member with its closure assembly against its seat member to provide a cleaning action.

2. A valve construction as set forth in claim 1 in which said means for flowing a cooling fluid comprises means for flowing steam into an upper end portion of said structural tube and into a tubular compartment which communicates with the upper end of said flow tube.

3. A valve construction as set forth in claim 2 in which said means for flowing a cooling fluid comprises a steam reservoir, conduit means in flow communication between said reservoir and said tubular compartment, said conduit means having a flexible conduit communicating with said tubular compartment which allows opening and closing movements of its poppet valve substantially in an unobstructed manner while still providing flow of cooling fluid therethrough.

* * * * *